United States Patent [19]

Migdal

[11] Patent Number: 4,479,487
[45] Date of Patent: Oct. 30, 1984

[54] APPARATUS FOR SOLAR WATER HEATING

[76] Inventor: Ilya Migdal, 3366 Verlol Ter., Palo Alto, Calif. 94303

[21] Appl. No.: 501,114

[22] Filed: Jun. 6, 1983

[30] Foreign Application Priority Data

Jun. 9, 1982 [IL] Israel ........................................ 66014

[51] Int. Cl.³ ................................................ F24J 3/02
[52] U.S. Cl. .................................... 126/422; 126/437; 126/419
[58] Field of Search ................ 126/422, 423, 432, 435, 126/436, 437, 417, 445, 446; 165/18

[56] References Cited

U.S. PATENT DOCUMENTS 4,019,495 4/1977 Frazier et al. .......................... 126/437
4,191,166 3/1980 Saarem et al. ........................ 126/422
4,270,522 6/1981 Vandenberg .......................... 126/437

Primary Examiner—James C. Yeung
Attorney, Agent, or Firm—Julian Caplan

[57] ABSTRACT

A solar water heating system comprises a solar collector having coils consisting of several stages, some of the coils having transparent covers having different heat insulation effects increasing with the temperature in the coil stages. Water is introduced to the collector either from a cold water source or from the hot water storage tank. The hot water discharge from the collector is divided into two branches, one branch leading to a mixing valve and one to a storage tank. Discharge from the storage tank leads either to the hot water line to the consumer or to an excess water utilization means, such as a spray to wash the collector, to an irrigation system, a roof cooling system or the like. The present invention improves the efficiency of the system and increases the accumulative capacity of the tank. Existing tank heaters may be used to reduce cost.

13 Claims, 9 Drawing Figures

APPARATUS FOR SOLAR WATER HEATING

FIELD OF INVENTION

The present invention relates to conversion of solar energy into usable energy and more particularly to an apparatus for solar water heating.

DESCRIPTION OF PRIOR ART

The desirability of utilizing solar energy for domestic water heating has long been recognized. Conventional apparatus for solar water heating can be divided into two groups: (1) working on the principle of natural circulation of water due to differences in specific gravities of hot and cold water (so-called thermosyphon); and (2) working on the principle of positive circulation, i.e., from a pump.

Apparatus working on the thermosyphon principle comprises a storage tank located above a solar heat collector, which consists of a heat-absorbing surface in a heat conductive relation with water circulating in a closed system. Water is circulated in said system due to differences in specific gravities of hot and cold water. Hot water is discharged for use by the consumer from the upper part of the storage tank. The consumption of hot water from the storage tank is compensated by additional supply of cold water to the lower part of the tank. From the collector water is fed into the intermediate part of the tank and discharged to the consumer from the upper part of the tank.

Gravity-circulating thermosyphon systems require that the hot water storage tank be located above the solar heat collector, which is often an architectural disadvantage, especially in houses which are already constructed. Therefore, pumped systems, which are adaptable to any tank collector location, are preferable for retrofit applications.

A typical solar water-heating pump system consists of the same elements as a thermosyphon system (storage tank, solar heat collector and circulation system) plus a pump used as a drive source for circulation. The storage tank, therefore, can be located in any convenient place.

Disadvantages of the conventional systems of both types lie in their thermodynamical imperfection due to the use of hot-water recirculation and a cyclically variable temperature in both the solar collector panel and the storage tank. Such systems lead to appreciable irreversible energy losses and reduce hot-water storage by 30%. Therefore, the storage tank volume is assumed to equal daily hot water consumption by the consumer.

OBJECTS

Accordingly, it is an object of the present invention to provide an efficient apparatus for solar energy heating. Another object is to increase efficiency for solar energy utilization, and reduce weight, manufacturing and installation expenses.

Still another object of the invention is simplification of a solution to the probelm of the collector freezing.

It is a further object to provide such a system, which can be used in conjunction with commonly used domestic hot water systems, with only minor modifications.

Another object is to reduce the volume of a storage tank without the loss of its capacity.

Still another object of the invention is to reduce starting time after interruption of operation.

Another object is to provide a construction of a solar collector which is simple to manufacture and convenient to transport and assemble.

Other objects of the present invention will become apparent upon reading the following specification and referring to the accompanying drawings in which similar characters of reference represent corresponding parts in each of the several views.

IN THE DRAWINGS

DESCRIPTION OF THE EMBODIMENT OF FIG. 1

Figure 1:
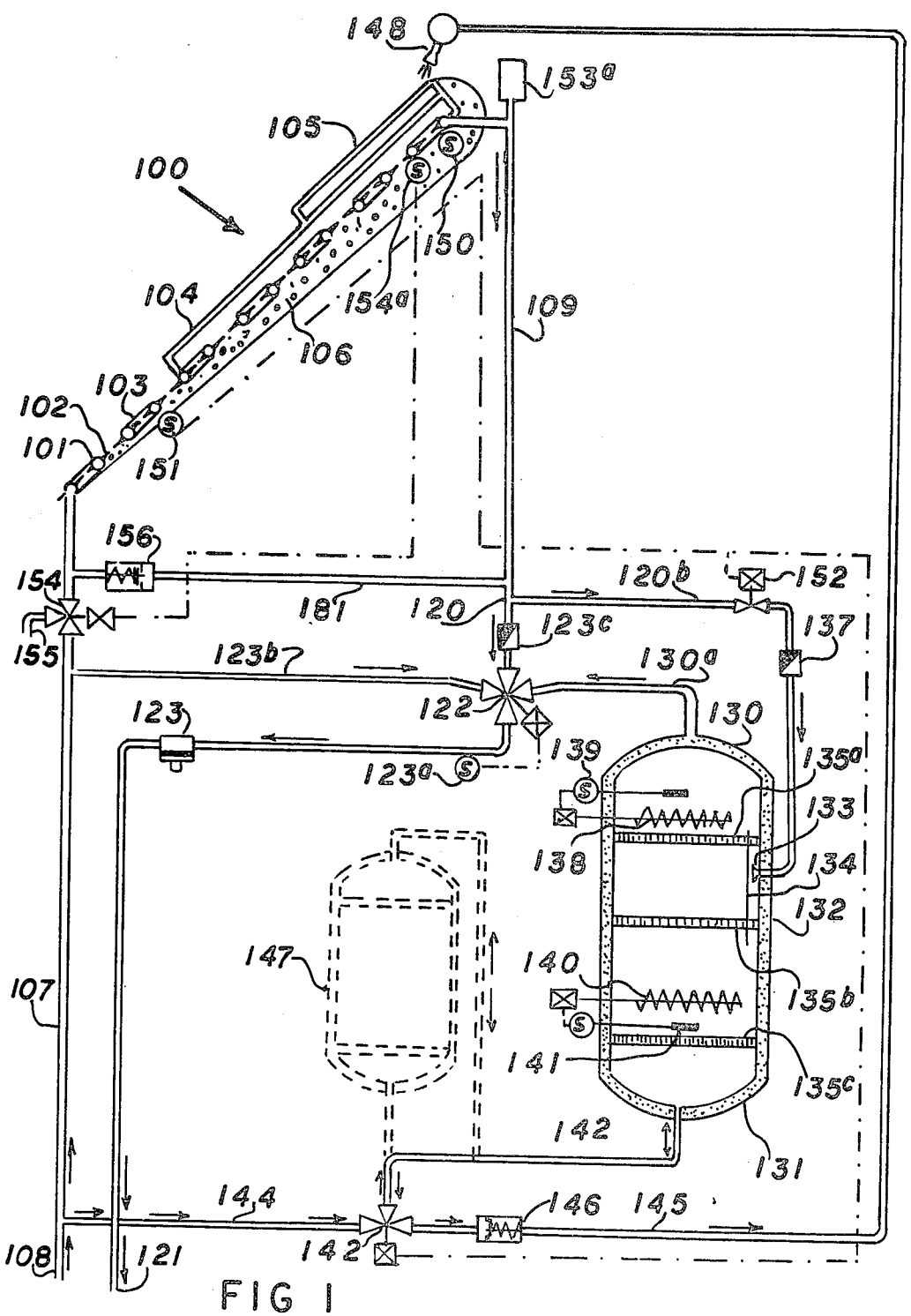
FIG. 1 is a solar water heating system with selection of hot water for accumulation using the head in the water supply line, and with an electric reserve heater.

Referring first to FIG. 1, a solar water heating system comprises a multistage solar collector 100 composed of a coil 101 and a heat absorbing surface 102 in heat conductive relation with said coil 101. The coil 101 is divided into several parts, e.g., three stages connected in a series, which have transparent covers of different kinds. Three stages are shown in FIG. 1, i.e., first stage 103, second stage 104 and third stage 105. The first stage 103 may have no covering, as in the illustrated embodiment, or it may be covered with one layer of glass. The second stage 104 is covered with one layer of glass, and the third stage 105 is covered with two layers of glass. This subdivision is determined by different heat absorbing capacities at different stages because the loss of heat at each stage depends on the temperature differential between the absorbing surface and temperature of the ambient atmosphere. Instead of glass, other solar heat transmitting materials—e.g., plastics—may be used.

Upon an increase of this temperature difference from one stage to another, it is expedient to reduce heat losses from the absorbing surface into the atmosphere, due to an increase in number of air layers formed between layers of glass. The number of stages, as well as types of coatings on the absorbing surface and the number of transparent layers will be determined in each particular case according to economic considerations and working conditions.

The same effect is improved by use of thermal insulation 106 of variable thickness on the back side of the solar collector panel 100 with increase of the insulation thickness from the cold end to the hot end.

Pipe 107, supplying water from a water supply system 108, is connected to the inlet side of the coil 101 of the solar collector 100. Because this pipe always supplies only cold water, it need not be insulated and may be made of plastic material. An output side of the coil 101 is connected to a pipe 109. Because pipe 109 serves to transport hot water, it should be made of a metal such as copper and proferably provided with insulation. The pipe 107, coil 101 and pipe 109 may have a relatively small diameter, e.g., of from ¼" to ½", because they transport water at a small flow rate.

The pipe 109 is branched into branch pipes 120a and 120b. The branch 120a leads to a discharge point through a four-way mixing control valve 122 and a safety valve, e.g., a fusable insert 123. A temperature-responsive sensor 123a is located beyond the mixing valve 122 in branch 120a. Sensor 123a controls operation of four-way mixing valve 122 and maintains the temperature of water available to the consumer at a level not less than, e.g., 50° C. A check valve 123c is located in the pipe 120a leading from the collector 100 to the four-way mixing valve 122.

One of the important elements of the system is an improved storage tank 130. The upper part of the storage tank is connected to the mixing valve 122 through a pipe 130a. Casing 131 of tank 130 is covered with insulation 132. The function of the storage tank is to accumulate, store and supply hot water. It is also used as a reserve heater. The branch 120b from the solar collector 100 is connected to the tank 130 at point 133, extending through casing 131 and directing the stream onto deflector wall 134, which, due to the effect of the so-called "adherence" of the stream to the surface, ensures upward or downward direction of the stream depending on the temperature of water. In order to ensure uniformity of distribution of flow of water, the tank 130 is provided with flow levelling grids 135a, 135b and 135c.

A check valve 137 is located in branch 120b. An electric heater having a sensitive element 139 is located in the upper part of the tank 130 above grid 135a, and an electric heater 140 having a sensitive element 141 is located in the lower part of the tank 130 above grid 135c.

A pipe 142a discharges from the bottom of the tank 130 and leads to one port of a three-way valve 142. Another port valve 142 is connected to pipe 144 which extends to inlet pipe 107. The third port of valve 142 leads to relief line 145. A back-pressure check valve 146 is located in the line 145 beyond valve 142.

In the case of a reconstruction of an existing water heating installation equipped with an electric heater, the tank 130, according to the present invention, is also used simultaneously as an accumulator. If the capacity of tank 130 as an accumulator is insufficient, an additional receiver 147 may be installed between the output from the tank 130 and valve 142 and used as a reserve container.

The relief line 145 may be used for many purposes. Thus it may terminate in a spraying device 148, which is used, e.g., for washing the outer surfaces of the transparent covers at the solar collector stages 104 and 105.

Thus, water does not return to the system, but rather is removed therefrom for further utilization. For example, it may be used for washing the panels of the solar collector, for cooling the roof of a building, for irrigation purposes, etc. Water is removed in very small quantities, no more than one volume of the tank 130 per day. Therefore, the losses of water will cost little, whereas the advantages obtained due to utilization of this water, especially in air polluted areas is much more appreciable.

The utilization of the discharged water for washing the solar collector panels will make them maintenance-free and eliminate the necessity of manual cleaning operations.

The description given above concerns the main functional units of the system. The following explanation relates to the automatic control means of the system.

Two sensors 150 and 151 are located at the surface of the coil 101 at different levels, the sensor 150 being located at the outermost turn of the coil, and the sensor 151 is located below. A control valve 152 is located in branch 120b. Valve 152 is actuated under the effect of a predetermined temperature difference between temperature detected by the sensors 150 and 151. Opening of valve 152 is adjusted, under control of the temperature difference, between complete opening and complete closing. The control valve 152 is interlocked with valve 142 so that the latter is actuated simultaneously with operation of valve 152.

As has been mentioned above, this system makes it possible to utilize pipes of smaller diameter than in a conventional system. It may create complications, when it is necessary to drain water from the system, e.g., as a freeze protection means. A special air damper 153a is provided for this purpose. It comprises a small-volume closed container (of from 3 to 6 liters, i.e. about 1.5-2 volumes of that of the interior of the coil 101), which is connected to the uppermost point of the coil 101. A freeze protection valve 154 is provided in the pipe 107.

A sensor 154a, which detects temperatures close to the freezing point, is attached to the surface of the coil 101. The sensor 150 may fulfill the same function as the sensor 154a and control operation of the freeze protection valve 154.

The pipe 109 is connected to pipe 181 and is provided with a back-pressure check valve 156. A drain 155, controlled by valve 154, drains collector 100 and pipes 109 and 181.

Figure 2:
FIG. 2 is a cross-sectional view of rolled sections used for a solar collector unit prior to assembly.
Figure 3:
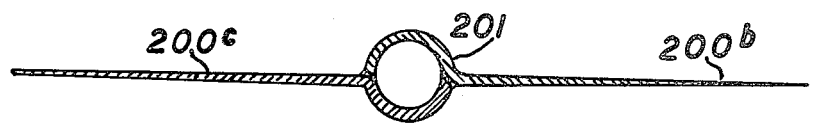
FIG. 3 is a cross-sectional view of the structure of FIG. 2 with the parts assembled.

FIG. 2 illustrates a preferred construction of coil 101. A section used in such coil comprises a shaped element 200 formed, e.g., by rolling from sheet metal of variable thickness. In case of mass production, it may be shaped simultaneously with rolling on a rolling mill. Each section preferably tapers outwardly and has a semicircular hook-shaped inner end. As shown in FIG. 3, two such sections 200a and 200b are combined by welding to form a tube 201. Joints between two elements are formed by welding or by any other method which provides a seal against leakage.

Figure 4:
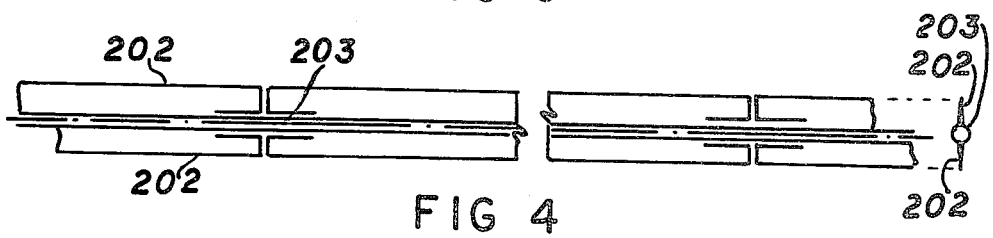
FIG. 4 is a plan view of a strip shown in FIG. 3.

The assembled unit may be of a considerable length and have a strip-like configuration shown in FIG. 4 with heat-transferring fins 202 and a water-transporting tube 203. Prior to bending the strips of FIG. 4 into coils, transverse slits and longitudinal inward extending notches are formed. Short tube sections 203 bridge the space between slits and notches.

Figure 5:
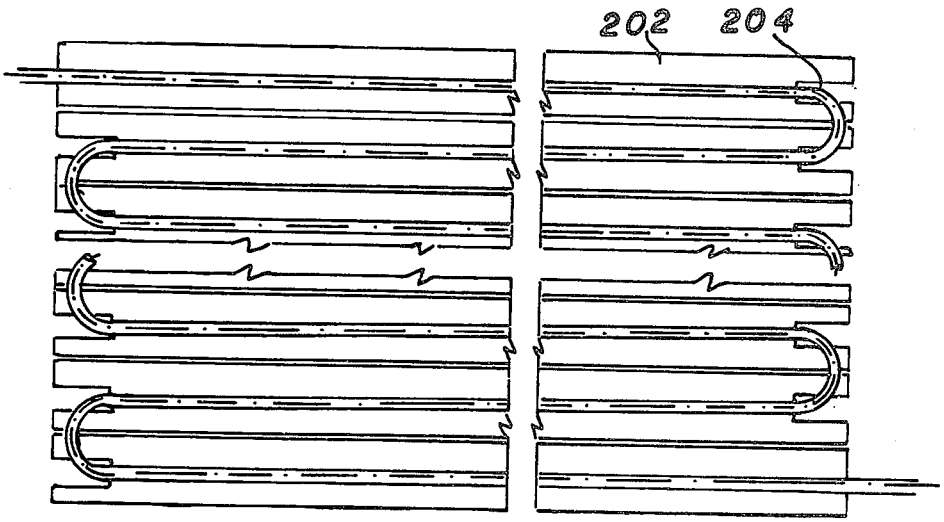
FIG. 5 is an elevational view of an assembled solar collector unit formed from the strip of FIG. 4.

FIG. 5 shows a completed solar panel. The structures between slits and notches are reversely bent at the transverse slits. The bridging short tube sections 203 are bent into semicircular members 204 which interconnect the oppositely directed parallel sections between slits. As shown in FIG. 5, the semicircular sections partially overlap the ends of the parallel sections.

The number of sections, their lengths and the manner in which they are joined together are subject to considerable variation. The form shown in FIGS. 2-5 is a presently preferred embodiment. The formation of the water-transporting coil and heat-absorbing surfaces from an integral sheet-metal blank considerably increases the heat-transferring efficiency in conducting the heat from the heat-absorbing surfaces to water.

Operation of the system of FIG. 1

The apparatus for solar water heating described above and shown in FIG. 1 operates in the following manner:

Cold water from the water supply system 108 is fed via the pipe 107 to the cold side, i.e., to the inlet of the coil 101 and subsequently through the first, second and third stages 103, 104 and 105, respectively, of the solar collector 100. On its way, the water is heated due to transfer of heat from the heat absorbing surface 102. The heat-absorbing surface 102, in turn, is heated directly by sunlight at the first stage 103 and through the transparent covers at the second stage 104 and third stage 105. The temperature of the water is gradually increased from the first to the last stage, reaching the limit 75°-85° C. at the ultimate stage depending on seasonal conditions.

From the outermost turn of the solar collector 100, water flows via the pipe 109 to branches 120a and 120b.

Considering first the case when water from the solar collector 100 is supplied directly to the consumer, bypassing the storage tank 130, water flows through the pipe 120a to the mixing valve 122, which at this moment is open, and is supplied further to the consumer through pipe 121. When the system operates under these conditions, the temperature of the water, flowing from the solar collector to the mixing valve 122, will vary depending on the volume of the water supplied to the valve 122. The more the consumption, the lower the temperature of the water. This can be considered as a positive factor because the efficiency of the collector is increased in proportion to the decrease in temperature of the water taken from the collector, i.e., in this case the operation is shifted to the more efficient range.

When the temperature of the water supplied to the valve 122 is reduced below 50° C., under the control of the sensor 123a the mixer valve 122 will add a flow of hot water from the upper part of the storage tank 130 through pipe 130a, under the pressure of cold water supplied during this period from the water supply line 108 via the now open two-position three-way valve 142 and pipe 142a.

When the temperature of water beyond valve 122 is above 50° C., under the control of the sensor 123a, the mixing valve 122 will add a flow of cold water taken through the pipe 123b from the cold water pipe 107.

If the valve 122 fails to keep the temperature above 50° C., a fusable insert 123 opens and water is drained from the pipe 121. This prevents the danger of scalding, which is an important factor in childcare facilities and hospitals.

Considering now operation of the system when water is not supplied to the consumer or supplied in quantities less than that supplied to the storage tank at 80° C., an excess of hot water at a temperature of 80° C. is fed through the branch pipe 120b and the control valve 152 to the storage tank 130. This provides differential selection of water for accumulation.

The operation of the control valve 152 is controlled by the sensors 150 and 151, which detect the temperature difference at the inlet and outlet of the collector 100. By preserving the temperature difference between the sensors 150 and 151, this action varies the temperature of water supplied to the storage tank 130.

During wintertime with reduced solar radiation, the temperature of water from the collector 100 to the tank 130 is reduced, e.g., to 75° C., depending on the temperature of water in the water supply system 108. Thus, the provision of the sensors 150 and 151 makes it possible to automatically establish a reduced upper limit of the water temperature for wintertime, whereby the tank is filled entirely with water, e.g., at 75° C. instead of partially filling it with water at 85° C. This improves the efficiency of the system during wintertime.

The flow of water from the pipe 120b is directed to the deflector wall 134 and adheres thereto, as has been mentioned above. If this water is warmer than that in the upper part of the tank 130, it flows upward. If it is colder than water in the upper part of the tank it is directed downward. In other words, the supplied water is automatically separated depending on its temperature. Thus, the whole interior of the tank is filled with hot water, even with possibly different temperatures at the upper end lower temperature at the bottom, and solar collector 100 operates in the manner most efficient for the given weather conditions. This arrangement also reduces irreversible thermodynamic losses connected with the process of mixing between more heated and less heated water.

The two-position valve 142 is switched simultaneously with actuation of the control valve 152, so that it covers the flow of cold water from the water supply line 108 and opens the passage for water from the lower part of the tank to the relief line 145 through the back-up check valve 146. Water displaced from the relief line 145 is removed via spraying devices 148 and may be utilized in various other ways, as above described.

Water in the tank 130 passes through the levelling grids 135a, 135b and 135c. These grids restrict mixing of water of different temperatures and ensure uniformity of its motion.

In case there is no solar radiation, the solar collector 100 does not supply hot water in required quantities and the required quantity of hot water is taken from the storage tank 130. During this process hot water is substituted for cold water, which is fed into the lower part of the tank 130 from the water supply system 108. When the temperature of water in the upper part of the tank 130 is reduced below 50° C., the sensitive element 139 switches on the electric heater 138, maintaining the temperature of water in the upper part of the tank at a given level of 50° C. Thus, the consumer receives hot water at 50° C. irrespective of weather conditions.

After sunset the sensitive element 141, which is equipped with a time relay (not shown) checks the temperature of water in the entire volume of the tank 130, and switches on the second heater 140, which starts heating water in the lower part of the tank 130 until the entire volume of water in the tank is heated to the given temperature.

Thus, both heaters 138 and 140 compensate for lack of solar radiation in the preceeding day and create a reserve volume required for average consumption of hot water in each particular installation. The second heater 140 operates either for a predetermined time or is switched off after the water has reached a predetermined temperature at the location of the sensor 141.

In geographical areas where temperature can be reduced below the freezing point, freeze protection means are required. Therefore, when the temperature is close to the freezing point, the sensor 150, or a specially provided sensor 154a, actuates the freeze protection valve 154, which stops the supply of cold water to the collector and at the same time drains water from the collector coil. At this moment the air, which has been trapped and compressed in the air damper 153a during the filling of the system, forces water out of the coil 101 under pressure.

At the end of the process of draining the coil 101, the back-pressure check valve 156 is actuated and water contained in the pipe 109 is drained through the same freeze protection valve 154.

In case of reconstruction of an existing local water heating installation, the capacity of which is insufficient as an accumulator, water is fed from the bottom of the heater to the additional receiver 147 which, in this case, fulfills the same function as the main storage tank 130 in a newly designed construction.

DESCRIPTION OF EMBODIMENT OF FIG. 6

Figure 6:
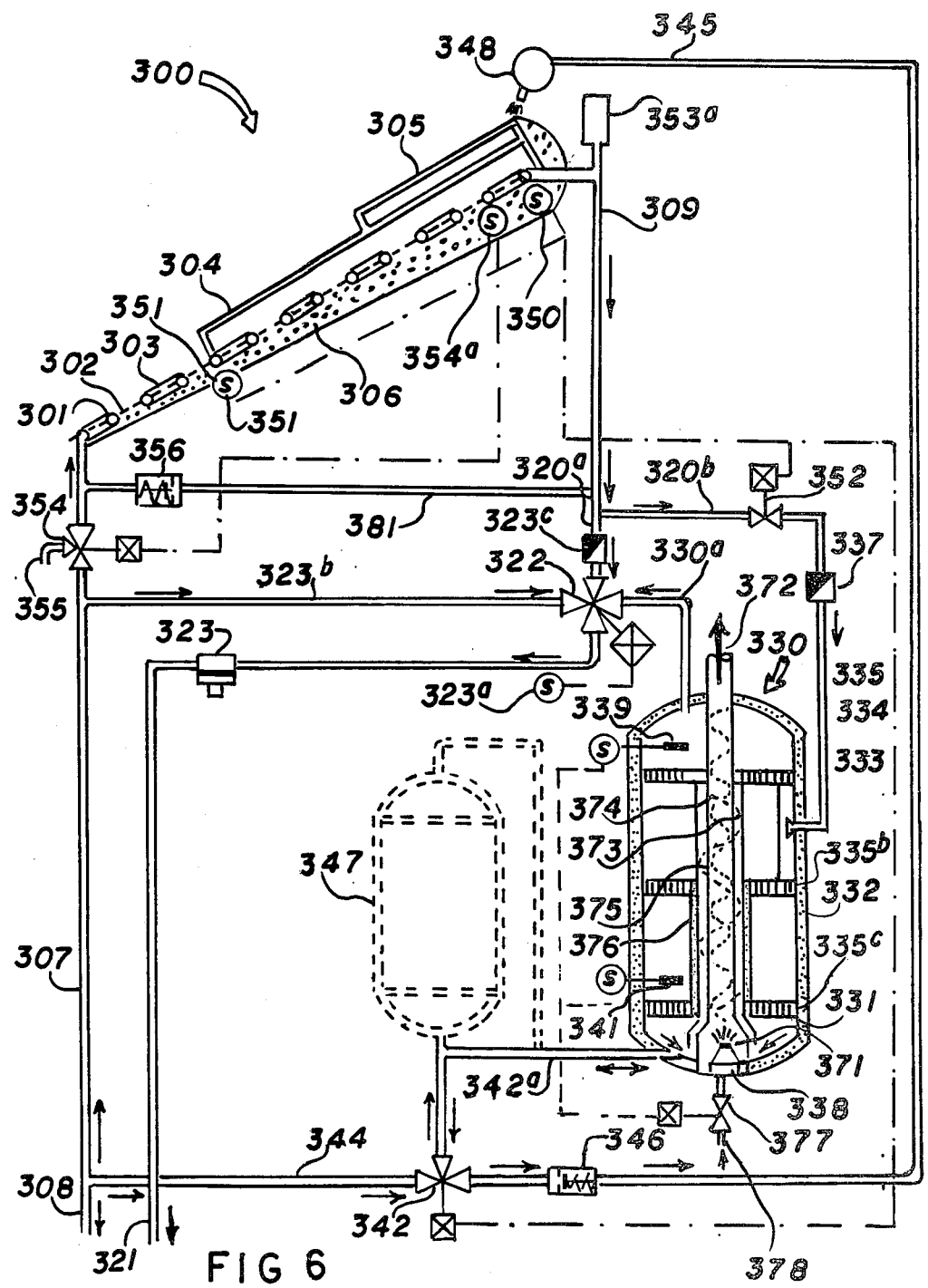
FIG. 6 is a view similar to FIG. 1 modified for use of a gas reserve heater.

FIG. 6 illustrates a solar water heating system with selection of hot water for accumulation using the head in the water supply line, but in combination with a gas reserve heater.

In principle, apparatus of this embodiment is similar to that of FIG. 1 with the distinction that a gas heater is used instead of an electric one. However, it requires a modification of storage tank 330.

A gas burner 338 is located in a combustion chamber 371, arranged in the lower part of the storage tank 330. A gas flue 372 extends from the combustion chamber 371 upwardly. The interior of the combustion chamber chamber 371 and the gas flue 372 are sealed against the water-containing cavity of the tank 330.

A water guiding shell surrounds the gas flue 372 in order to ensure an intensive heat transfer from the wall of the gas flue 372. A helical groove 375 is formed on the inner surface of the gas flue 372 in order to intensify the heat-exchange process and a helical groove 374 is provided on the outer surface of the gas flue for the same purpose. The water guiding shell 373 is provided with thermal insulation 376 for accumulation of hot water in the upper part of the tank 330.

Sensitive elements 339 and 341 (similar to elements 139 and 141 in the embodiment of FIG. 1) are located in the upper and lower parts of the tank 330, respectively. However, in this case they control operation of the gas heater 338 through a gas flow regulator 377 in a gas supply line 378.

Operation of the System of FIG. 6

The system shown in FIG. 6 operates in the same manner as that of FIG. 1 with the exceptions that the sensors 339 and 341 control operation of the gas heater 338 instead of the electric heater, and that water is guided along the guiding shell 373 in heat-exchange relation with respect to the external surface of the gas flue 372. In other respects the modification of FIG. 6 resembles that of FIG. 1 and the same reference numerals, increased by 200 designate corresponding elements.

DESCRIPTION OF THE EMBODIMENT OF FIG. 7

Figure 7:
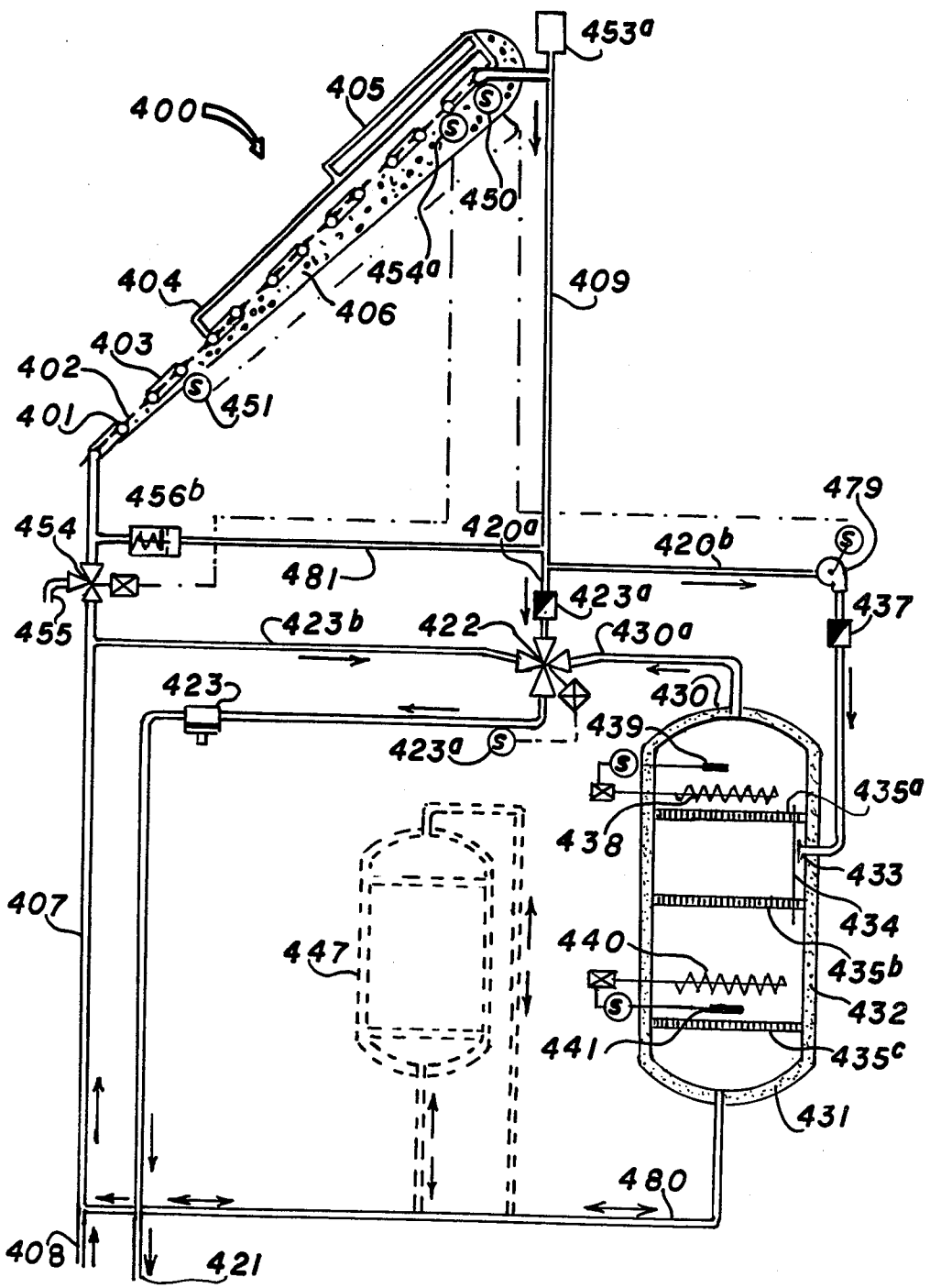
FIG. 7 is a view similar to FIG. 1 of a solar water heating system using a small variable-capacity pump and with an electric reserve heater.

FIG. 7 illustrates a modification of a solar water heating system with selection of hot water for accumulation, with the use of a small variable-capacity pump and with an electric reserve heater. The outermost turn of the coil 401 of the solar collector 400 is connected with the pipe 409 which is provided with branch 420b. The latter is connected to a small variable-capacity pump 479, e.g., of 20–40 watt power with head up to 0.5–2 kg/cm$^2$. The pump 479 is controlled by the sensors 450, 451 in the same manner as the valve 152 in the embodiment of FIG. 1. The lower part of the storage tank 430 is connected to a pipe 480, which is connected to the pipe 407. A pipe 481 connects the point of intersection between the supply line 408 and pipe 476 with the lowermost turn of the coil 401.

The embodiment of FIG. 7 does not require application of the control valve 152, two-position three-way valve 142, check valve 146 and pipe 145 used in FIG. 1. Furthermore, this version does not require secondary utilization of the water displaced from the system. Thus, the system of FIG. 7 is closed.

Operation of the System of FIG. 7

The solar heating system of FIG. 7 operates in the following manner:

Considering, first, the case when water is supplied to the consumer, the water supply line 408 supplies water to the pipe 481 and flows to the lowermost point of the solar collector 400. As in the version of FIG. 1, water passes through the stages 413, 414, 415 of the collector 400 and from the upper end of the collector 400, it flows into the pipe 409 and further to the four-way valve 422. The valve 422 directs water to the consumer line 421. When the temperature of the upper part of the collector 400 exceeds a predetermined level, e.g., of 85° C., the sensor 450 actuates the pump 479, which starts pumping water to the storage tank 430. The sensor 450 is of a proportional-type, and it adjusts the flow of the pump 479 depending on the water temperature.

The sequence in the tank is the same as described with regard to FIG. 1. From the bottom of the storage tank 430, cold water is fed to the pipe 480, flows through the pipe 407 and further to the lower end of the coil 401. However, this cycle does not comprise recirculation in terms of conventional closed-type solar water heating systems, because in this case the solar collector 400 receives cold water from the lower part of the tank 430. Nevertheless, physically circulation is possible in extreme cases beyond normal operation conditions, when water has not been consumed in previous days. In case of overheating, protective means are used, as known in the art.

It should be taken into consideration that, although this system includes a pump, it has a function different from that of pumps of conventional pumped systems, as it is used only for loading of the tank 430 with water from the collector 430 which is above a predetermined temperature e.g., over 85° C. for accumulation. Therefore, pump 479 should be of small capacity and delivers only that water which is taken from accumulation. When hot water is withdrawn from tank 430, it is replaced with cold water from pipe 408 via pipe 480 which leads to the lower part of tank 430. In other respects the system of FIG. 7 resembles that of FIG. 1 and the same reference numerals increased by 300 indicate corresponding elements.

DESCRIPTION OF THE EMBODIMENT OF FIG. 8

Figure 8:
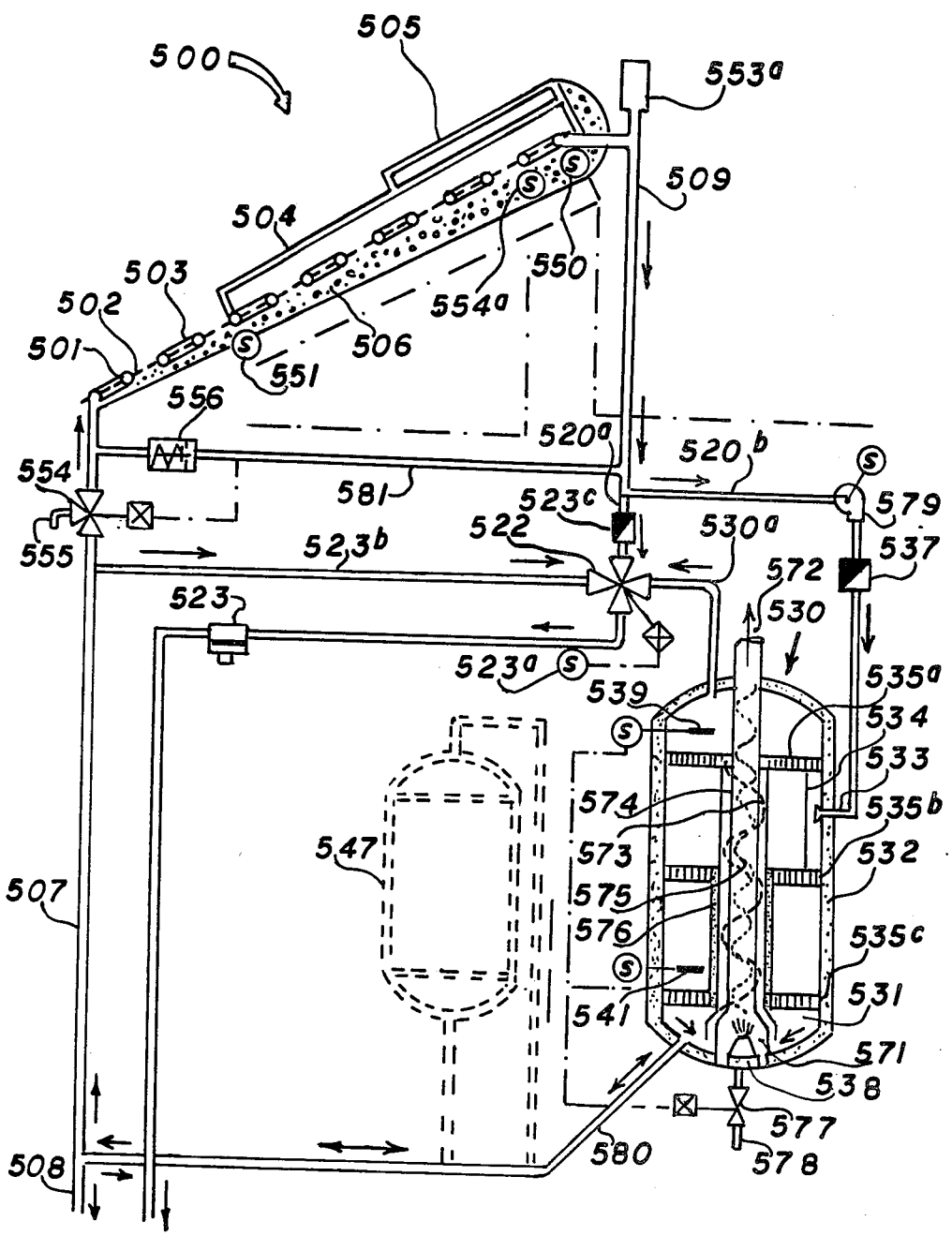
FIG. 8 is a view similar to FIG. 7 using a gas reserve heater.

FIG. 8 illustrates a solar water heating system with selection of hot water for accumulation with the use of a small variable-capacity pump 579. This system is a combination of the pump-aided water accumulation unit of FIG. 7 and the storage tank 330 with the gas burner and heat exchange means of FIG. 6.

Therefore, the operation of this embodiment does not need detailed explanation. The same reference numerals as in FIG. 6, increased by 400 designate corresponding elements.

DESCRIPTION OF THE EMBODIMENT OF FIG. 9

Figure 9:
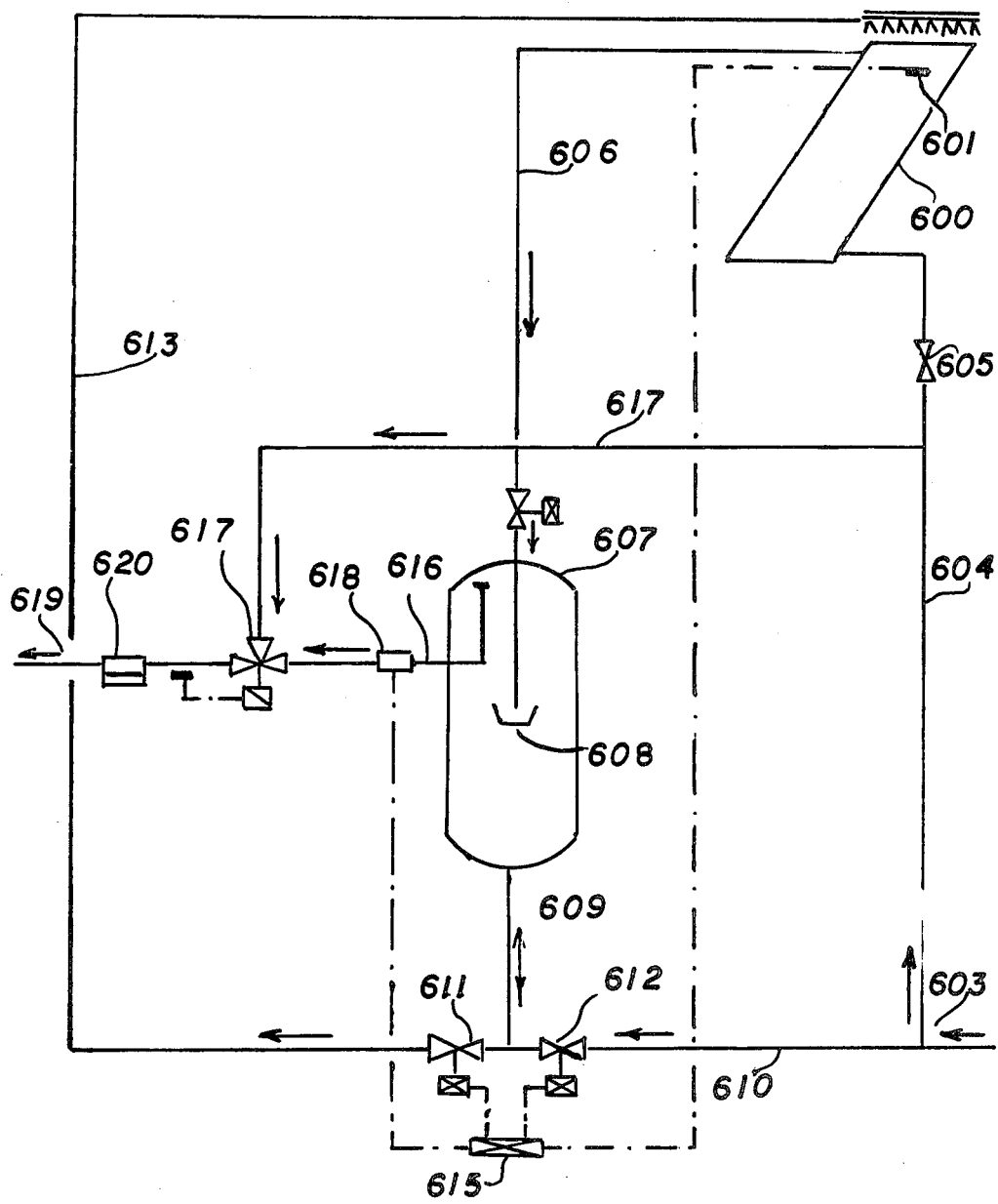
FIG. 9 is a view similar to FIG. 1 of a still further modified embodiment.

FIG. 9 illustrates a simplified version of a solar water heating system made according to the present invention. This system comprises a solar collector 600 with a sensor 601, which measures the temperature at the upper part of the collector 600. The input to the collector 600 is connected to a water supply line 603 through a pipeline 604 provided with a flow restrictor 605. The output from the collector 600 terminates in a pipe 606 leading to a storage tank 607.

A deflector 608 for directing the flow from the end of the pipe 606 upward is arranged in front of the discharge end of the pipe 606. The lower part of the storage tank 600 is connected by means of a pipe 609 to a pipeline 610 leading from the water supply line 603. Two mutually interlocked valves 611 and 612 are provided in the system. The valve 611 is located in a relief line 613, which may terminate in a sprayer 614 used, e.g., for washing the panels of the solar collector, for irrigation purposes or the like. The valve 612 is installed in the pipe 610 between the pipe 609 and the water supply line 603. Both valves are connected to a control unit 615, which actuates under control of the sensor 601, when a predetermined temperature is attained. A pipe 616 connects the upper part of the storage tank 607 with a three-way valve 617 and is provided with a flow sensor 618. The latter is connected to the control unit 615. One port of the three-way valve is connected to the pipe 616, the second port to a pipe 617a leading from the pipe 604, and the third or output port to the discharge line 619. A fusible insert 620 is located in the discharge pipe 619 and fulfills the same function as in the previous embodiments.

The system operates in two modes: hot water accumulation mode and hot water consumption mode. In the hot water accumulation mode, cold water is supplied to the solar collector 600 from the water supply line 603 through the pipe 604. The water is heated in the collector 600 and hot water is fed through the pipe 606 to the storage tank 607.

If water has higher temperature than that in the storage tank 607, it is directed upward from the deflector 608. If its temperature is lower than that in the storage tank, the water fed to the tank flows downward. In this mode of operation the valve 611 is open and the valve 612 is closed. Therefore hot water is accumulated in tank 607 and displaces water from the lower part of the tank through the valve 611 and relief line 609 for further utilization or removal.

Referring to the hot water consumption mode, water from the water supply line 603 is fed through the now open valve 612 and pipe 609 to the lower part of storage tank 607 and displaces hot water from the upper part of the tank. Under effect of flow through the pipe 616 the flow sensor 618 monitors the control unit 615 so that operation of the valves 611 and 612 depends on the supply of hot water into the tank 607 and consumption thereof by the consumer.

The flow restrictor 605 restricts the supply of water to the tank 607 through the collector 600. The temperature of water to the consumer is adjusted automatically by adding cold water from the water supply line 603.

While I have thus described preferred embodiments of the present invention, many variations will be apparent to those skilled in the art. The foregoing description is intended to be illustrative only and all such variations and modifications as are in accord with the principle described are meant to fall within the scope of the appended claims. For example, the solar water heating apparatus may be used for individual applications instead of domestic use, and secondary utilization, illustrated for cleaning solar collector panels, may be applied for irrigation purposes or the like.

What is claimed is:

1. Apparatus for solar water heating comprising a solar collector constructed to receive solar radiation and having a heat absorbing surface and a coil in heat conductive relation with said heat absorbing surface, said coil having a cold water inlet and a hot water outlet, a cold water supply line connected to said inlet; a storage tank for accumulating water heated by said solar collector, said storage tank having top, lower and intermediate ports; a first pipe connecting said outlet to a branched pipe, said branched pipe having a first branch and a second branch said first branch being connected to said intermediate port of said storage tank through a proportional-flow valve means, said proportional-flow valve means being open when the temperature at said outlet is greater than at said inlet; a multiway mixing valve connected to said second branch and to a second pipe, said second pipe leading to the upper part of said storage tank and to said cold water supply line, an outlet from said multiway mixing valve being connected to a discharge pipe, said multiway mixing valve being responsive to temperature in said outlet so that the temperature of water in said discharge pipe is above a pre-determined amount, and a three-way two-position valve connected to the cold water supply line and to said lower port of the storage tank, said three-way two-position valve being opened and closed as said proportional-flow valve means is opened and closed; whereby water supplied to the consumer through said discharge pipe is always at a temperature above said predetermined amount by reason of said multiway mixing valve discharging hot water from said outlet or said top port at said predetermined amount and, when water is not being required by the consumer, water from said outlet is supplied to said intermediate port or said cold water supply line.

2. An apparatus for solar water heating according to claim 1 which further comprises a relief line connected to said lower part of said storage tank and to means for secondary utilization of water.

3. An apparatus for solar water heating according to claim 2, wherein said means for secondary utilization comprises spraying means for washing the surfaces of the solar collector.

4. An apparatus for solar water heating according to claim 1 wherein said solar collector comprises a plurality of serially connected stages, each having differentiated solar energy absorption means with a decrease of the heat-transmission coefficient of the heat absorbing surface to the ambient atmosphere from the preceding stage to the subsequent one.

5. An apparatus for solar water heating according to claim 4, wherein said differentiated solar energy absorption means comprises layers of transparent material with air layers therebetween, the number of such layers increasing from the preceding stage to the subsequent stage, and thermal insulation means, the insulation efficiency of which is increased from each preceding stage to the subsequent stage.

6. An apparatus for solar water heating according to claim 1 which further comprises two temperature sensitive elements attached to the surface of the collector, a first said sensor being at the outlet of said collector and a second said sensor being at a lower level; said sensors forming a differential sensor means connected to actuate said proportional flow valve to actuate said proportional flow valve at a predetermined temperature differential.

7. An apparatus for solar water heating according to claim 1 which further comprises actuating means for said mixing valve and a temperature sensitive element located in said discharge pipe beyond said multiway mixing valve, said sensitive element being set to a predetermined temperature and connected to said actuating means for said mixing valve, said actuating means being actuated at a predetermined temperature of water supplied to said discharge pipe.

8. An apparatus for solar water heating according to claim 1 further comprising a freeze protection valve installed in the cold water supply line, said freeze protection valve having actuating means connected to a sensor located at said outlet and a line connecting said first pipe with said cold water supply line above said freeze protection valve, said last-mentioned line being provided with a check valve.

9. An apparatus for solar water heating according to claim 8, wherein an air damper means is provided at said outlet.

10. An apparatus for solar water heating according to claim 1 which further comprises reverse heater means comprising two heaters located in the upper and lower parts of said storage tank, respectively, and each provided with an associated temperature sensor adjusted to a predetermined temperature, each said sensor controlling operation of one of said heaters.

11. An apparatus for solar water heating according to claim 10, wherein said heaters comprise electric heaters.

12. An apparatus for solar water heating according to claim 1 which further comprises reserve heater means, including a gas burner located in the lower part of the storage tank in a combustion chamber sealed from the water-containing portion of said storage tank, said chamber terminating in a gas flue arranged in axial direction of the tank and extending outside said tank, two temperature sensitive means, each adjusted to a predetermined temperature being located in the upper and lower parts of the storage tank, respectively, said temperature sensitive means controlling operation of said gas burner.

13. An apparatus for solar water heating according to claim 12, wherein said gas flue is enclosed by a water guiding shell forming a channel of annular cross-section between the outer surface of the flue and inner surface of said shell, said channel being open to the water-containing portion of the storage tank, there being helical grooves formed on the outer and inner surfaces of said gas flue.

* * * * *